United States Patent
Kang et al.

(10) Patent No.: US 7,369,815 B2
(45) Date of Patent: May 6, 2008

(54) POWER COLLAPSE FOR A WIRELESS TERMINAL

(75) Inventors: Inyup Kang, San Diego, CA (US); Karthikeyan Ethirajan, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 289 days.

(21) Appl. No.: 10/786,585

(22) Filed: Feb. 24, 2004

(65) Prior Publication Data

US 2005/0064829 A1    Mar. 24, 2005

Related U.S. Application Data

(60) Provisional application No. 60/504,507, filed on Sep. 19, 2003.

(51) Int. Cl.
*H04B 1/16* (2006.01)
*H04M 1/00* (2006.01)

(52) U.S. Cl. .................. 455/73; 455/127.5; 455/343.1; 455/574

(58) Field of Classification Search ........ 455/572–574, 455/343.1–343.4, 127.1, 127.5
See application file for complete search history.

(56) References Cited

U.S. PATENT DOCUMENTS

| | | | | |
|---|---|---|---|---|
| 5,615,162 A | | 3/1997 | Houston | 365/226 |
| 5,745,860 A | * | 4/1998 | Kallin | 455/574 |
| 6,133,871 A | * | 10/2000 | Krasner | 342/357.06 |
| 6,151,681 A | | 11/2000 | Roden et al. | 713/322 |
| 6,219,564 B1 | * | 4/2001 | Grayson et al. | 455/574 |
| 6,442,407 B1 | * | 8/2002 | Bauer et al. | 455/574 |
| 6,625,478 B1 | * | 9/2003 | Nonogaki | 455/574 |
| 6,715,085 B2 | * | 3/2004 | Foster et al. | 726/27 |
| 7,089,344 B1 | * | 8/2006 | Rader et al. | 710/308 |
| 2002/0025839 A1 | | 2/2002 | Usui | 455/574 |
| 2002/0094840 A1 | * | 7/2002 | Hattori et al. | 455/558 |
| 2003/0133337 A1 | * | 7/2003 | Yamada et al. | 365/200 |

FOREIGN PATENT DOCUMENTS

EP    1328066    7/2003

* cited by examiner

*Primary Examiner*—Simon Nguyen
(74) *Attorney, Agent, or Firm*—Howard Seo; Eric Ho; Thomas R. Rouse

(57) ABSTRACT

An integrated circuit for a modem processor includes processing units that are partitioned into "always-on" and "collapsible" power domains. An always-on power domain is powered on at all times. A collapsible power domain can be powered off if the processing units in the power domain are not needed. A power control unit within an always-on power domain powers down the collapsible power domains after going into sleep and powers up these domains after waking up from sleep. Tasks for powering down the collapsible power domains may include (1) saving pertinent hardware registers for these power domains, (2) freezing output pins of the IC to minimally disturb external units, (3) clamping input pins of the collapsed power domains, (4) powering down a main oscillator and disabling the oscillator clock, and so on. Complementary tasks are performed for powering up the collapsed power domains.

39 Claims, 6 Drawing Sheets

POWER COLLAPSE FOR A WIRELESS TERMINAL

RELATED APPLICATIONS

This application claims priority to U.S. Provisional Patent Application No. 60/504,507 filed Sep. 19, 2003.

BACKGROUND

I. Field

The present invention relates generally to circuits, and more specifically to techniques for conserving power for a wireless terminal.

II. Background

A wireless terminal (e.g., a cellular phone) in a cellular communication system is only sporadically active and remains in an "idle" mode for significant periods of time when no call is in progress. To ensure that the terminal can still receive messages sent to it by the system, the terminal periodically monitors a paging channel even while it is in the idle mode. These messages may alert the terminal to the presence of an incoming call, carry updated system parameters for the terminal, and so on.

The wireless terminal is typically portable and powered by an internal battery. To conserve power and extend standby time between battery recharges, the system typically sends messages on the paging channel to the terminal at designated times. The paging channel may be divided into "slots", and the terminal may be assigned to specific slots by the system. Thereafter, the terminal enters an "active" state prior to its assigned slot, monitors the paging channel for messages, and transitions to an "inactive" state if additional communication is not required. In the time period between successive active states, the terminal is asleep in the inactive state and deactivates as much circuitry as possible to conserve power. "Sleep" refers to the time during which the terminal is in the inactive state.

Conventionally, the terminal powers down analog circuit blocks (e.g., power amplifiers, oscillators, and so on) and disables clocks to digital circuit blocks while in the inactive state. A digital circuit that is fabricated in complementary metal oxide semiconductor (CMOS) consumes power via two mechanisms: (1) by dissipating dynamic current when the circuit is active and switching and (2) by drawing leakage current when the circuit is inactive and not switching. In contemporary CMOS fabrication technology, the dynamic current is many times greater than the leakage current. In this case, significant power saving may be achieved for CMOS digital circuits by simply disabling the clocks to these circuits to shut off the dynamic current.

However, leakage current is not negligible and will become a significant portion of the total power consumption as CMOS technology scales to smaller geometry. This is because leakage current increases at a very high rate with respect to the decrease in transistor size. The higher leakage current, coupled with long periods of inactivity, consumes power and reduces standby time for portable devices that use battery power, which is highly undesirable.

There is therefore a need in the art for techniques to conserve power for a wireless terminal.

SUMMARY

Techniques for performing "power collapse" for a wireless terminal are provided herein. Power collapse refers to the powering down of circuit blocks/processing units when not needed to reduce leakage current and conserve power. To implement power collapse, the circuit blocks/processing units within an integrated circuit (IC) used for the wireless terminal are partitioned into multiple power domains. Each power domain couples to a power supply via a power connection. Each power domain is designated as either "always-on" or "collapsible". An always-on power domain is powered on at all times (i.e., while the wireless terminal is powered on). A collapsible power domain can be powered off if the processing units in the power domain are not needed.

Power collapse is typically performed in conjunction with a sleep timeline that indicates when the wireless terminal can go to sleep. The sleep timeline may be different for different wireless communication systems. A power control unit within the always-on power domain powers down the collapsible power domains after going into sleep and powers up these domains just before waking up from sleep. The collapsed power domains may also be powered up based on an external interrupt event.

A set of tasks is typically performed for powering down the collapsible power domains. For example, the powering down tasks may include saving pertinent hardware registers of the collapsible power domains, freezing output pins of the IC to minimally disturb external units coupled to the IC, clamping input pins of the collapsed power domains, powering down a main oscillator and disabling a main clock from the oscillator, and so on. A complementary set of tasks is typically performed for powering up the collapsed power domains. For example, the powering up tasks may include powering up the main oscillator and enabling the main clock, restoring software, firmware, and hardware states, releasing input and output pins, and so on. These various tasks are described in further detail below.

Various aspects, embodiments, and features of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
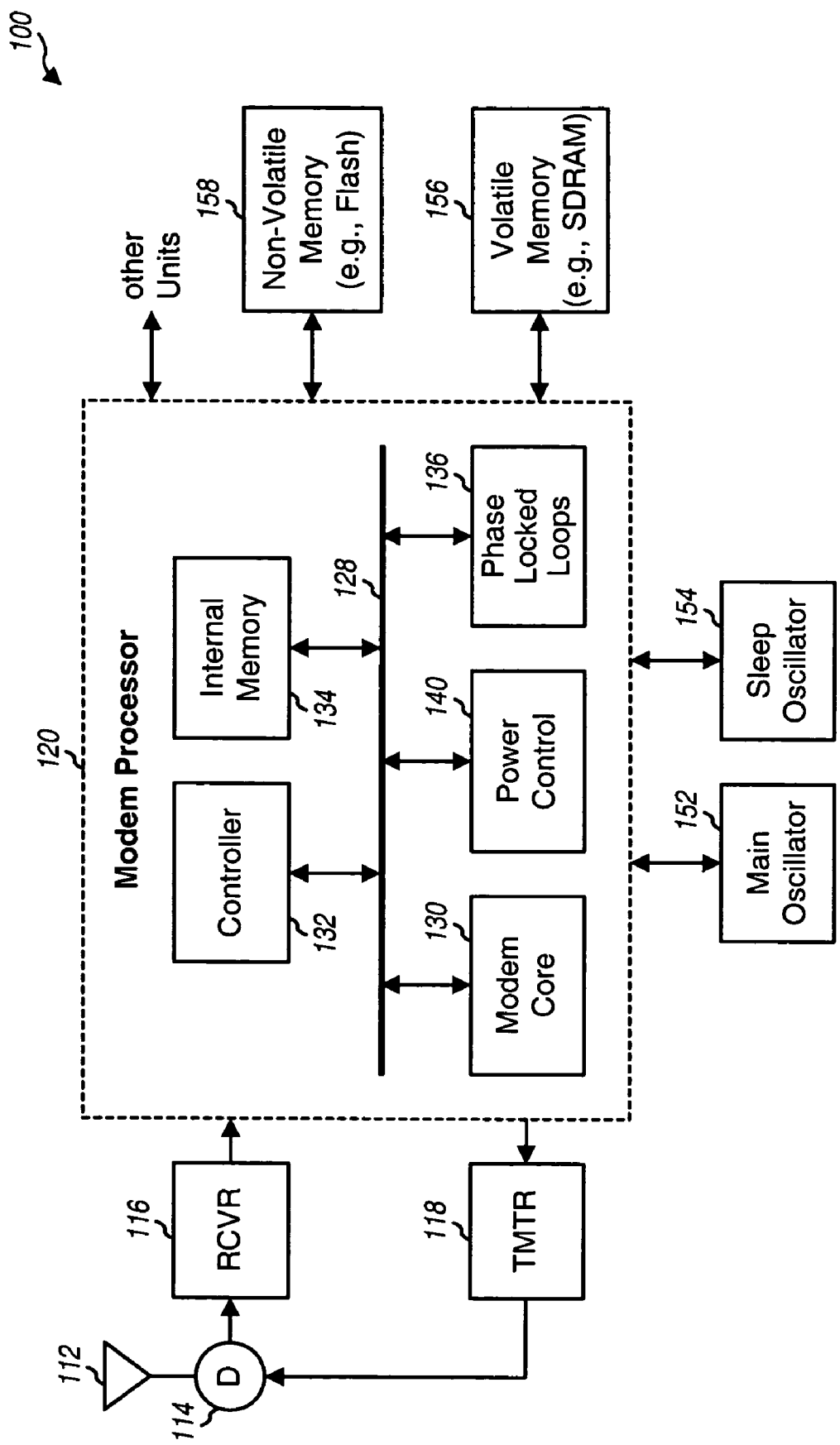
FIG. 1 shows a block diagram of the wireless terminal.

FIG. 1 shows a block diagram of a wireless terminal 100, which may be a cellular phone, a handset, a wireless communication device, a personal digital assistant (PDA), and so on. Terminal 100 may monitor and/or communicate with one or more wireless communication systems such as a Code Division Multiple Access (CDMA) system, a Global System for Mobile Communications (GSM) system, a Bluetooth system, a multiple-input multiple-output (MIMO) system, an orthogonal frequency division multiple access (OFDMA) system, and so on. A CDMA system may implement one or more CDMA standards such as IS-2000 and IS-95 (which are also known as "1x-EV DV"), IS-856 (which is also known as "1x-EV DO"), Wideband-CDMA (W-CDMA), and so on. A CDMA system that implements W-CDMA is also known as a Universal Mobile Telecommunications System (UMTS) system. Terminal 100 is capable of providing bidirectional communication via a receive path and a transmit path.

For the receive path, signals transmitted by base stations in one or more systems are received by an antenna 112, routed through a duplexer (D) 114, and provided to a receiver unit (RCVR) 116. Receiver unit 116 conditions (e.g., filters, amplifies, and frequency downconverts) the received signal, digitizes the conditioned signal, and provides data samples to a modem processor 120 for further processing. For the transmit path, modem processor 120 processes data to be transmitted by terminal 100 and provides "data chips" to a transmitter unit (TMTR) 118. Each data chip is a value to be transmitted in one chip period, which is $1/(1.2288 \times 10^6)$ for some CDMA systems. Transmitter unit 118 conditions (e.g., converts to analog, filters, amplifies, and frequency upconverts) the data chips and generates a modulated signal, which is routed through duplexer 114 and transmitted from antenna 112.

Modem processor 120 includes various processing units that support monitoring and/or communication with one or more systems. Modem processor 120 further interfaces with other units within terminal 100. For the embodiment shown in FIG. 1, modem processor 120 includes a modem core 130, a controller 132, an internal memory 134, phase locked loops (PLLs) 136, and a power control unit 140, all of which couple to a bus 128. Modem core 130 performs demodulation and decoding for the receive path and encoding and modulation for the transmit path. Controller 132 controls the operation of various processing units within modem processor 120. Internal memory 134 stores data and program code used by the processing units within modem processor 120 and may include a cache, random access memories (RAMs), read only memories (ROMs), and so on. PLLs 136 control various oscillators within terminal 100 such that these oscillators operate at the proper frequencies. Power control unit 140 controls power to various processing units within modem processor 120, as described below.

For the embodiment shown in FIG. 1, modem processor 120 further couples to a main oscillator 152, a sleep oscillator 154, a volatile memory 156, and a non-volatile memory 158, all of which support modem processor 120. Main oscillator 152 provides a high-frequency main/system clock used by modem processor 120 for normal operation and may be implemented, for example, with a temperature-compensated crystal oscillator (TCXO). Sleep oscillator 154 provides a low-frequency sleep clock used by an always-on power domain within modem processor 120. Volatile memory 156 provides bulk storage for data and code used by modem processor 120 and may be implemented with, for example, a synchronous dynamic RAM (SDRAM) or some other type of memory. Non-volatile memory 158 provides bulk non-volatile storage and may be implemented with, for example, a NAND Flash, a NOR Flash, or some other type of non-volatile memory.

In general, modem processor 120 may include fewer, more and/or different processing units than those shown in FIG. 1. The specific processing units included in modem processor 120 are typically dependent on the design of modem processor 120 and the communication system(s) being supported. Modem processor 120 may also couple to fewer, more and/or different external units than those shown in FIG. 1.

Modem processor 120 may be implemented in a single CMOS integrated circuit for various benefits such as smaller size, lower cost, less power consumption, and so on. As IC fabrication technology continually improves and migrates to smaller geometry, the size of transistors continues to shrink. A lower power supply may be used for a smaller geometry IC to reduce power consumption. The threshold voltage (which is the voltage at which a transistor turns on) for smaller-size transistors is often reduced (i.e., lowered) to improve operating speed. However, the lower threshold voltage and smaller transistor geometry result in higher leakage current, which is the current passing through a transistor when it is not switching. Leakage current is more problematic as CMOS technology scales down to 90 nm (nanometer) and smaller.

Power consumption due to leakage current can be reduced by powering down as much digital circuitry as possible when not needed. Terminal 100 may only be active for a small portion of the time while it is idle. In this case, the power to many of the processing units can be powered down (i.e., "collapsed") for a large portion of the time to reduce power consumption and extend standby time.

Modem processor 120 is partitioned into multiple power domains. Each power domain includes processing units that are coupled to a power supply via a power connection. Each power domain is designated as either always-on or collapsible. An always-on power domain is powered on at all times while terminal 100 is powered on. A collapsible power domain may be powered down if the processing units in the power domain are not needed. Each collapsible power domain may be powered on or off independently of the other collapsible power domains. As used herein, "power up" and "power on" are synonymous terms that are used interchangeably, and "power down" and "power off" are also synonymous terms.

Figure 2A:
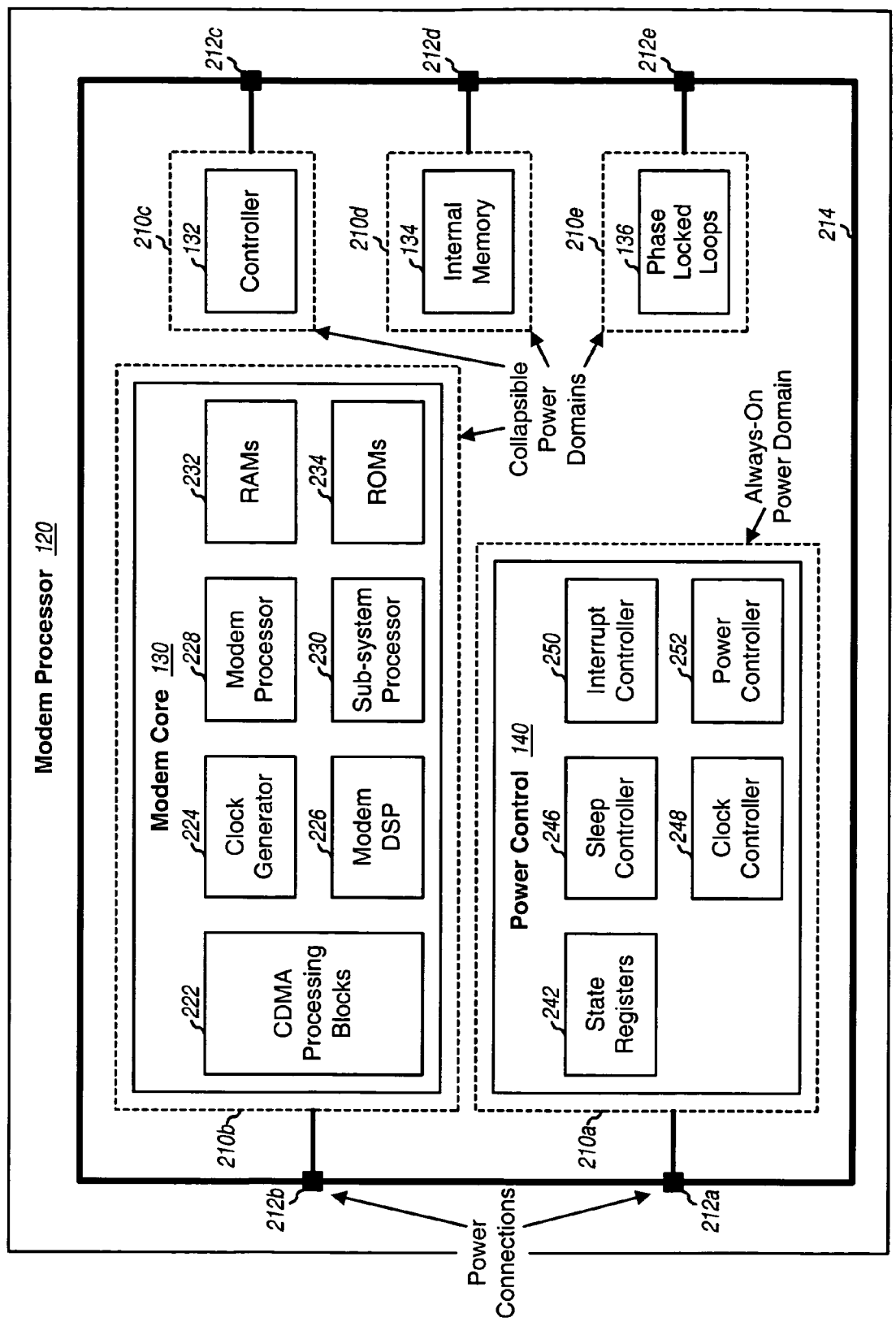
FIG. 2A shows the partitioning of the modem processor into multiple power domains.

FIG. 2A shows the partitioning of the processing units within modem processor 120 into multiple power domains 210. In this example, the five processing units 130 through 140 in modem processor 120 are placed in five different power domains 210a through 210e. In general, each power domain can include any number of processing units, and each processing unit can include any number of circuit blocks. Each power domain 210 couples to a power supply bus 214 via a power connection 212. For the example shown in FIG. 2A, power domain 210a for power control unit 140 is the only always-on power domain, and all other power domains 210b through 210e are collapsible.

Each of processing units 130 through 140 within modem processor 120 may include various circuit blocks. For example, modem core 130 includes CDMA processing blocks 222, a clock generator 224, a modem digital signal processor (DSP) 226, a modem processor 228, a sub-system processor 230, RAMs 232, and ROMs 234. Clock generator 224 generates various clocks used by the processing units within modem processor 120. CDMA processing blocks 222 perform (1) encoding, interleaving, and modulation for the transmit path and (2) demodulation, deinterleaving, and decoding for the receive path. For example, CDMA processing blocks 222 may implement a rake receiver with multiple searchers and finger processors for the receive path, as is known in the art. CDMA processing blocks 222 also perform other ancillary functions such as maintaining a real time counter (RTC), which provides system time, for each system being monitored by terminal 100. Modem DSP 226 performs modem (modulation/demodulation) functions that are not time critical such as pilot channel processing, traffic channel processing (e.g., processing on soft decisions) and so on. Modem processor 228 controls the operation of various circuit blocks within modem core 130. Sub-system processor 230 controls input/output (I/O) buses and peripherals. Processors 228 and 230 may be implemented with reduced instructing set computing (RISC) processors. RAMs 232 and ROMs 234 store data and code used by modem core 130.

Power control unit 140 controls the power for each of the collapsible power domains and is described in further detail below.

Figure 2B:
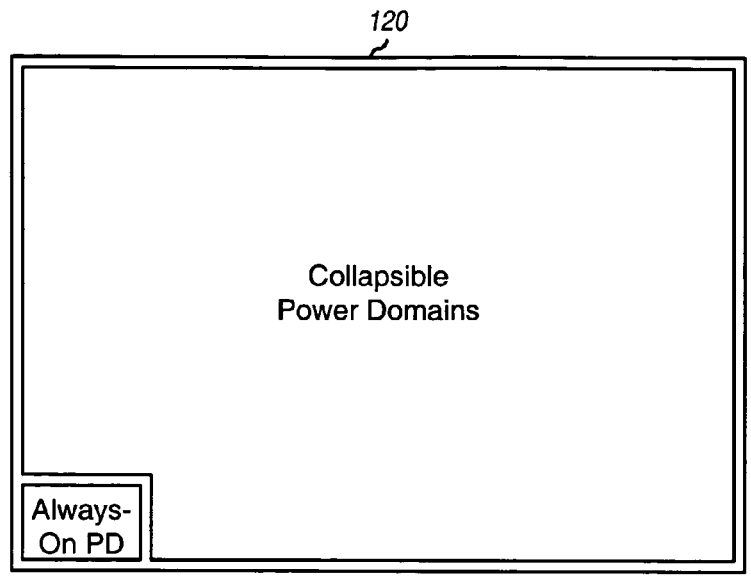
FIG. 2B shows a layout of an integrated circuit for the modem processor.

FIG. 2B shows an exemplary layout of a CMOS integrated circuit for modem processor 120. FIG. 2A shows the processing units for modem processor 120 but does not indicate the size of each unit. FIG. 2B shows the size of always-on power domain 210*a* versus the size of collapsible power domains 210*b* through 210*e*. In a typical implementation, the always-on power domain occupies only a small portion (e.g., two to three percent) of the total die area of the integrated circuit, and the collapsible power domains occupy most of the die area. Thus, leakage current for the integrated circuit may be significantly reduced by powering down the collapsible power domains when not needed.

Power connection 212 for each collapsible power domain 210 includes appropriate hardware to supply power to and remove power from the processing blocks within the power domain. Each collapsible power domain 210 can be powered down if none of the processing units in the domain is needed.

Figure 3:
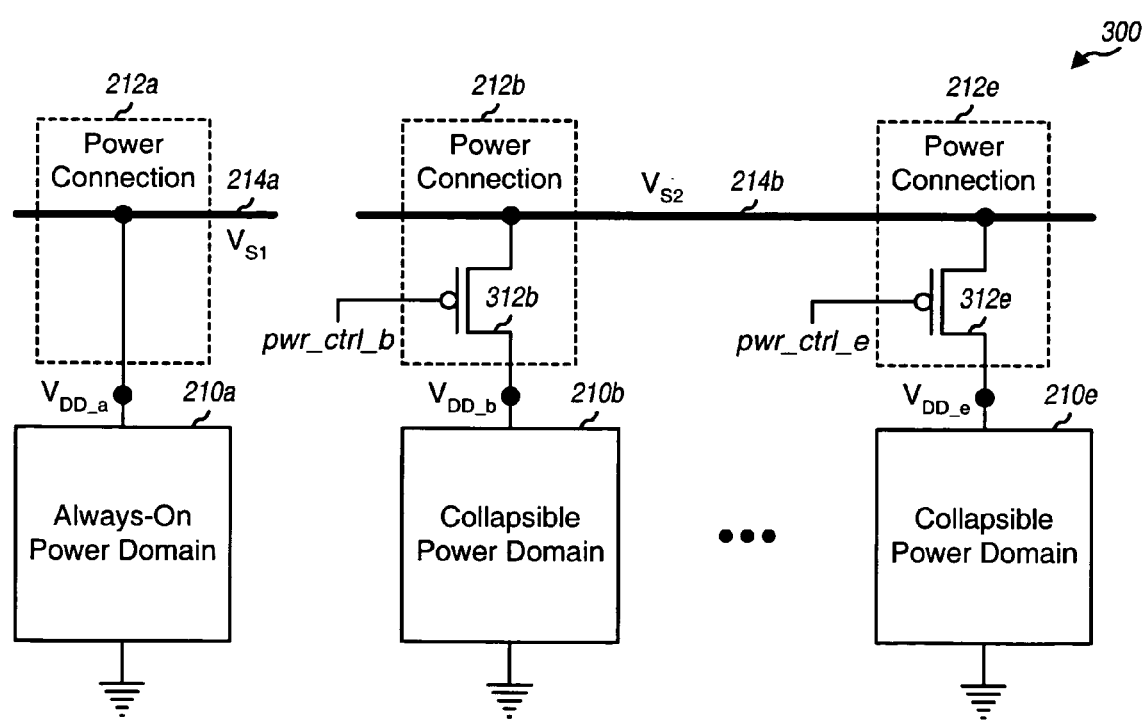
FIG. 3 shows a configuration for connecting the power domains to power supply bus(es)

FIG. 3 shows a configuration 300 for connecting power domains 210 to power supply buses. Power connection 212*a* couples always-on power domain 210*a* directly to a power supply bus 214*a*, which is denoted as $V_{S1}$. Power connections 212*b* through 212*e* are for collapsible power domains 210*b* through 210*e*, respectively. For the embodiment shown in FIG. 3, each of power connections 212*b* through 212*e* includes a headswitch that can be either enabled to power up the domain or disabled to power down the domain. The headswitch for each collapsible power domain x (where x=b, c, d, or e) may be implemented with a P-channel FET 312 having a source that couples to a power supply bus 214*b* (which is denoted as $V_{S2}$), a drain that couples to an internal power bus for the power domain (which is denoted as $V_{DD\_x}$), and a gate that receives a pwr_ctrl_x control signal for the power domain. The pwr_ctrl_x signal is logic low to power up power domain x and logic high to power down power domain x. Power supply buses 214*a* and 214*b* may have the same or different voltages.

Power for the collapsible power domains may be controlled in other manners, and this is within the scope of the invention. For example, a footswitch between the power domain and circuit ground may be used to control power to the power domain. As another example, both headswitch and footswitch may be used for a given collapsible power domain. In general, an integrated circuit may include any number of power supply buses. One power supply bus may be used for input/output (I/O) pads for the integrated circuit and this power supply bus may be powered on at all times while terminal 100 is powered on. Always-on power domain 210*a* may then be coupled to this power supply bus for the I/O pads. Multiple power supply buses may be used to provide different supply voltages or for different power regimes.

Power control unit 140 includes various circuit blocks that support powering on and off the collapsible power domains. For the embodiment shown in FIG. 2A, power control unit 140 includes state registers 242, a sleep controller 246, a clock controller 248, an interrupt controller 250, and a power controller 252. State registers 242 store (1) powered down status of the collapsed power domains and (2) pertinent hardware states (e.g., finite state machine (FSM) states) that cannot be restored by software upon power up.

Sleep controller 246 monitors activity and keeps track of sleep timeline for each system being monitored. Terminal 100 may monitor one or multiple systems such as, for example, 1x-EV DV, 1x-EV DO, and GSM systems, which are described below and shown in FIG. 6. In an embodiment, sleep controller 246 includes one sleep core for each system. Each sleep core includes a sleep counter and a sleep finite state machine (FSM). The sleep counter maintains system time continuity during sleep. When the sleep counter expires at the start of warm-up time (see FIG. 4), sleep controller 246 interrupts power controller 252 to wake-up. The sleep counter continues to count the duration of the warm-up time. When the sleep counter expires at the start of on-line time, sleep controller 246 interrupts modem processor 120 to indicate the start of on-line processing. During the active state, a real time counter (RTC) within modem core 130 maintains system time for each system being monitored.

Clock controller 248 disables main clock 152 prior to powering down and enables main clock 152 after powering up. Interrupt controller 250 monitors input signals from other units external to modem processor 120. These input signals are received via the pads of modem processor 120. Interrupt controller 250 detects for interrupts from these external units and alerts power controller 252 when it receives an external interrupt requiring modem processor 120 to wake up.

Power controller 252 generates various control signals used to support powering down and up the collapsible power domains. Power controller 252 receives signals from sleep controller 246 indicating the start and end of a sleep period and external interrupts from interrupt controller 250. Power controller 252 may maintain a finite state machine (FSM) for each block to be controlled (e.g., main oscillator) and a FSM for each power domain to be separately powered on and off. Based on these various inputs and the FSMs, power controller 252 generates the control signals to power down and up the collapsible power domains at the appropriate time. For example, power controller 252 can generate the pwr_ctrl signals for the switches in power connections 212, as shown in FIG. 3. Power controller 252 can also generate a signal for an external power management unit, which can then power up or down the power supply bus(es) for the collapsible power domains.

Power control unit 140 stores information for the timeline for each system being monitored and determines the time periods in which the collapsible power domains may be powered down. Power control unit 140 may power down the collapsible power domains if the duration of sleep is sufficiently long (e.g., exceeds a predetermined time period). Power control unit 140 may forego powering down if the sleep period is too short and powering down would not be justified by the overhead associated with powering down and up. If the collapsible power domains are not powered down because the sleep period is too short, then the main clock may still be disabled to cut off dynamic current and reduce power consumption.

Power control unit 140 performs a number of tasks to properly power down and power up the collapsible power domains within modem processor 120. Table 1 lists some of the tasks that may be performed for powering down and up the collapsible power domains. Fewer, additional and/or different tasks may also be performed, depending on the design of modem processor 120.

TABLE 1

| | Powering Down Tasks | | Powering Up Tasks |
|---|---|---|---|
| 1 | Save pertinent hardware state registers from collapsible power domains | 1 | Power on main oscillator 152 |
| | | 2 | Power on collapsed power domains |
| 2 | Put external memory 156 in low power mode | 3 | Enable main clock to collapsed power domains |
| 3 | Freeze IC output pins | 4 | Take external memory 156 out of low power mode |
| 4 | Disable main clock to collapsible power domains | 5 | Reboot software |
| 5 | Power off collapsible power domains | 6 | Re-download firmware image |
| | | 7 | Restore hardware registers |
| 6 | Power off main oscillator 152 | 8 | Release IC output pins |

Some hardware states may need to be saved before powering down so that modem processor 120 can properly resume operation upon being powered on. The output pins for modem processor 120 are maintained at the "latest" logic state, which is the logic state right before powering down, during the entire time that modem processor 120 is powered down so that external units coupled to modem processor 120 are minimally affected by the modem processor being powered down. Memory 156 stores code and data used by various processing units within modem processor 120 and is placed in a low power mode when the modem processor is powered down. The main clock is disabled, and main oscillator 152 is also powered off during sleep. Power is removed from each collapsible power domain by controlling the switch in the power connection for that power domain. In general, complementary tasks are performed to power down and power up. Each of the tasks in Table 1 is described in further detail below.

Modem processor 120 includes various processing units that may be grouped into three different categories—general-purpose processors, specialized processors, and hardware blocks. The general-purpose processors (e.g., controller 132, modem processor 228, and sub-system processor 230) operate based on software code and may be configured to perform various functions. Specialized processors (e.g., modem DSP 226) operate based on firmware and are designed to perform specific functions (e.g., arithmetic functions, powering down/up tasks, and so on). The hardware blocks (e.g., CDMA processing blocks 222) perform specific processing and may utilize registers to maintain state information. The processing units within modem processor 120 may be interdependent on one another. For example, the hardware blocks may be controlled by the specialized processors, which may in turned be controlled by the general-purpose processors. In this case, the temporal order in which the processing units are restored after powering up is important.

During sleep, other analog and digital circuit blocks within terminal 100 may also be powered down. For example, the radio frequency (RF) front end, power amplifiers, oscillators, and so on for the transmit and receive paths are often powered down during sleep. Moreover, the circuitry for the transmit path does not need to be powered up to receive messages. For simplicity, only tasks and events related to powering down and up modem processor 120 are described below.

Many cellular systems use a paging channel to transmit messages to idle terminals. In a 1xEV DV system, the paging channel (PCH) is divided into (80 msec) paging channel slots. A terminal operating in a slotted mode is assigned specific slots on the paging channel. A slot cycle index (SCI) determines how often the terminal's assigned slots appear on the paging channel. An SCI of one indicates that the assigned slots appear every 2.56 seconds. Paging messages (if any) are sent to the terminal in its assigned slots.

Different cellular systems may use different structures and formats for the paging channel. However, the same general concept is typically used for all paging channel implementations. A terminal is assigned to only a small portion of the paging channel timeline and only needs to be active for a small portion of the time to process the paging channel. To conserve power, the terminal can sleep and most of the analog and digital circuits can be powered down.

Figure 4:
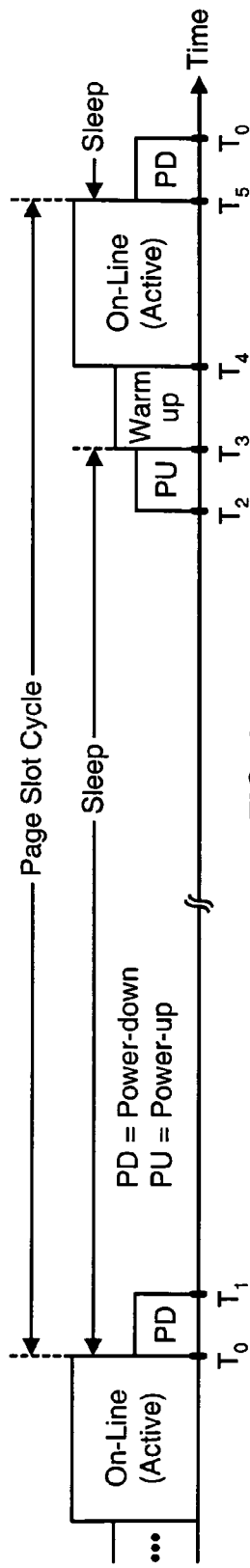
FIG. 4 shows a timeline for processing a paging channel for a wireless communication system.

FIG. 4 shows a timeline for processing the paging channel in the 1xEV DV system. In FIG. 4, a new paging slot cycle for terminal 100 starts at time $T_0$. Terminal 100 sleeps from time $T_0$ until its next assigned slot. Terminal 100 wakes up at time $T_3$, prior to its next assigned slot, and powers on and warms up the necessary circuitry. Terminal 100 receives and processes the paging channel starting at time $T_4$. Terminal 100 finishes processing the paging channel at time $T_5$ and thereafter goes back to sleep if additional communication is not needed. The terminal may sleep for a significant portion of the time. As an example, for the 1xEV system with SCI=1, the sleep time from $T_0$ to $T_3$ may be 2503 msec, the warm-up time from $T_3$ to $T_4$ may be 17 msec, and the active (i.e., on-line) time from $T_4$ to $T_5$ may be 40 msec. In this case, terminal 100 can sleep for over 97 percent of the time.

FIG. 4 also shows an overlay of power collapse over the sleep timeline. After completion of the on-line processing at time $T_0$, terminal 100 performs powering down tasks during the power-down period from time $T_0$ to time $T_1$. Prior to the warm-up time, terminal 100 performs powering up tasks during the power-up period from time $T_2$ to time $T_3$.

Figure 5A:
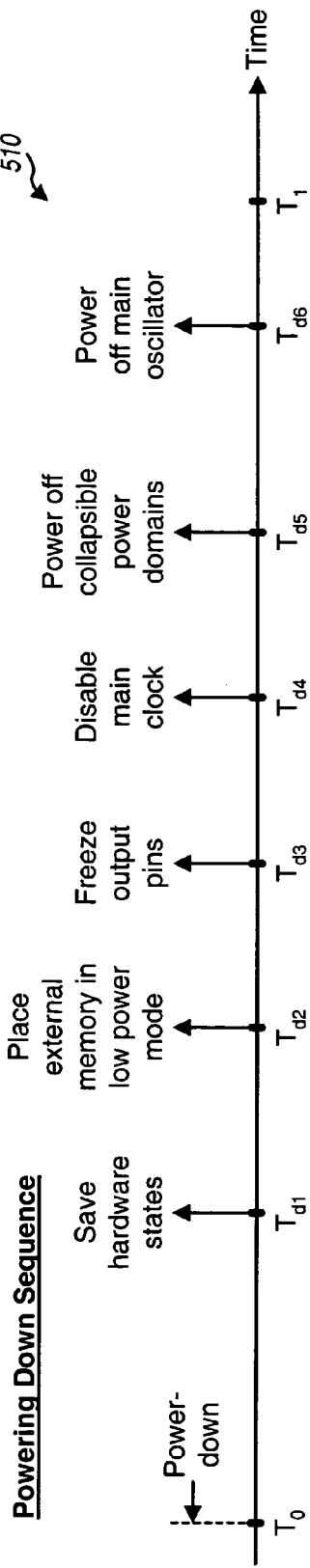
FIGS. 5A and 5B show a powering down sequence and a powering up sequence, respectively, for the collapsible power domains.

FIG. 5A shows a timeline for a powering down sequence 510 to turn off power to the collapsible power domains within modem processor 120. Power control unit 140 performs the tasks listed in Table 1 during the power-down period after it has been determined that the terminal can go to sleep because no additional communication is required. At time $T_{d1}$, the pertinent hardware registers are saved. At time $T_{d2}$, memory 156 is placed in the low power mode during sleep. At time $T_{d3}$, the state of the output pins for modem processor 120 is frozen. At time $T_{d4}$, the main clock is disabled. At time $T_{d5}$, power is removed from the collapsible power domains. At time $T_{d6}$, main oscillator 152 is powered down. The tasks for powering down may be performed in other chronological orders than that shown in FIG. 5A. These tasks can typically be performed within a short period of time (e.g., one msec).

Figure 5B:
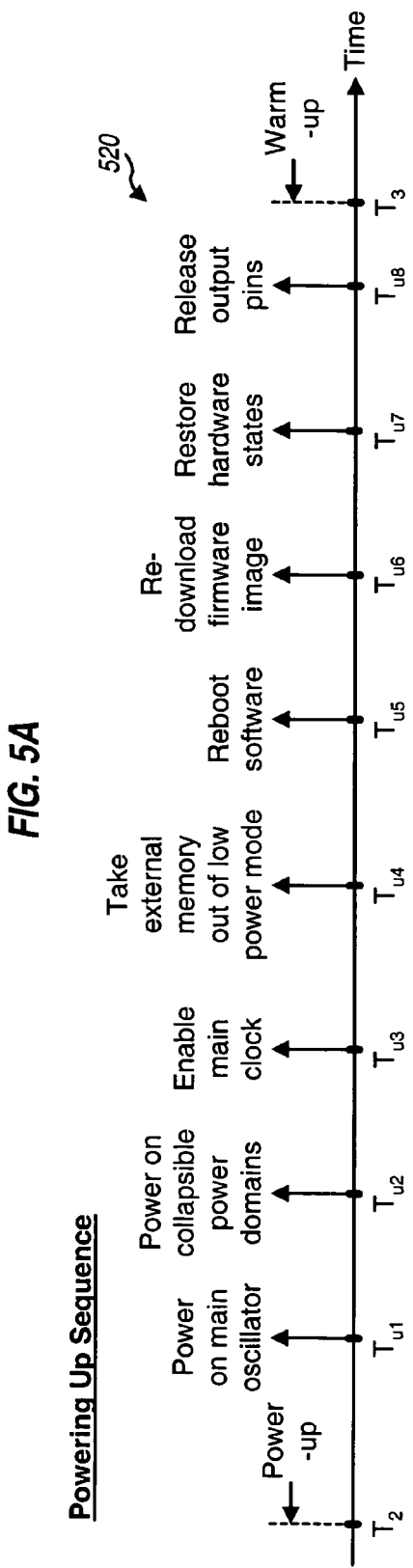

FIG. 5B shows a timeline for a powering up sequence 520 to turn on power to the collapsible power domains within modem processor 120. Power control unit 140 performs the tasks listed in Table 1 during the power-up period prior to the warm-up time for the assigned paging slot. At time $T_{u1}$, main oscillator 152 is powered up. At time $T_{u2}$, power is supplied to the collapsible power domains. At time $T_{u3}$, the main clock for the collapsible power domains is enabled. At time $T_{u4}$, memory 156 is taken out of the low power mode. At time $T_{u5}$, the software for modem processor 120 is rebooted. At time $T_{u6}$, the firmware image is re-downloaded. At time $T_{u7}$, the pertinent hardware registers are restored. At time $T_{u8}$, the output pins for modem processor 120 are released. The tasks for powering up may be performed in a relatively short period of time, for example, 10 to 25 μsec for an exemplary design. The powering up tasks may be performed in other chronological orders than that shown in FIG. 5B. In general, the powering up tasks in FIGS. 5A and 5B are performed at the appropriate times, which may be dependent on the design of modem processor 120 and the system.

FIGS. 5A and 5B show exemplary powering down and up sequences. Other powering down and up sequences with different tasks than those shown in FIGS. 5A and 5B may also be implemented. FIGS. 5A and 5B can also be viewed as flow diagrams for various steps that may be performed for powering down and up the collapsible power domains.

Terminal 100 may monitor multiple wireless communication systems of different technologies (e.g., 1x-EV DV, 1x-EV DO, GSM, and so on). Each system is associated with a specific timeline that indicates the permissible sleep times and the required on-line times for that system. Different systems typically have different timelines. Moreover, these systems are normally not synchronized to each other.

Figure 6:
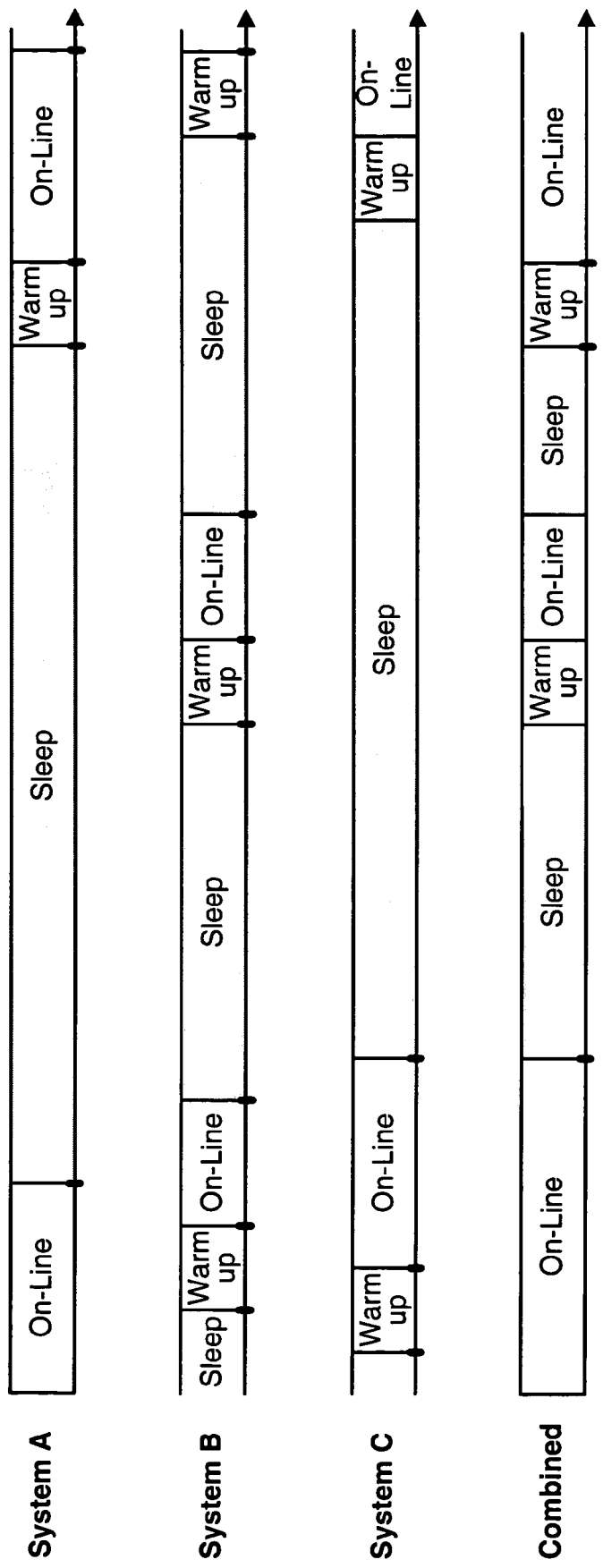
FIG. 6 shows timelines for three different systems.

FIG. 6 shows exemplary timelines for three different systems—systems A, B, and C, which may be, for example, a 1x-EV DV system, a 1x-EV DO system, and an UMTS system. For example, terminal 100 may have established a call with system A and still monitors the paging channel from system B. Each system being monitored by terminal 100 has a different timeline for the sleep and on-line times. The sleep times for modem processor 120 are the times during which all three systems are sleeping. A circuit block that is shared by multiple systems can be powered down only when all of these systems are sleeping. A circuit block that is used by only one system can be powered down even when this one system is sleeping. Power controller 250 identifies the common sleep period when all of the systems supported by terminal 100 are sleeping and decides whether or not to proceed with the power down sequence. Modem processor 120 may also perform a partial sleep in which only the collapsible power domains needed for the system being received are powered up and all other collapsible power domains are powered down.

As noted above, the software, firmware, and hardware are appropriately restored upon powering up after sleep. The software can be restored by performing a software reboot, as described below. The firmware can be restored by re-downloading a firmware image from external non-volatile memory 158 to internal RAMs (e.g., RAMs 232). The hardware can be restored by retrieving saved register states and having the software reconfigure the hardware registers. The temporal order for restoring the software, firmware, and hardware states is important if the processing units are interdependent, as described above.

The general-purpose processors within modem processor 120 operate based on code stored in volatile memory 156. The code may be (permanently) stored in non-volatile memory 158 and loaded into volatile memory 156 when terminal 100 is powered up. Thereafter, the general-purpose processors within modem processor 120 execute the code from volatile memory 156 instead of non-volatile memory 158.

A software boot process loads the code from non-volatile memory 158 to volatile memory 156. Different software boot processes may be implemented depending on the capabilities of non-volatile memory 158, which may be "executable" or "non-executable". An executable non-volatile memory (e.g., a NOR Flash) can be accessed like a RAM, and the code can be retrieved from this type of non-volatile memory and executed directly by the general-purpose processors within modem processor 120. A non-executable non-volatile memory (e.g., a NAND Flash) provides code in (e.g., 512-byte) pages, one page at a time, so the code is typically retrieved from this type of non-volatile memory and stored in another memory (e.g., an SDRAM) for use.

Software boot (which may also be referred to as a "cold" boot or a "power on" boot) is performed when terminal 100 is first powered on and includes a set of steps. Software reboot (which may also be referred to as a "warm" boot or a "resumed" boot) is performed when powering up after sleep and typically includes a subset of the steps performed for software boot. The specific steps to be performed for software boot and software reboot are typically dependent on system configuration, non-volatile memory type, and so on.

Figure 7:
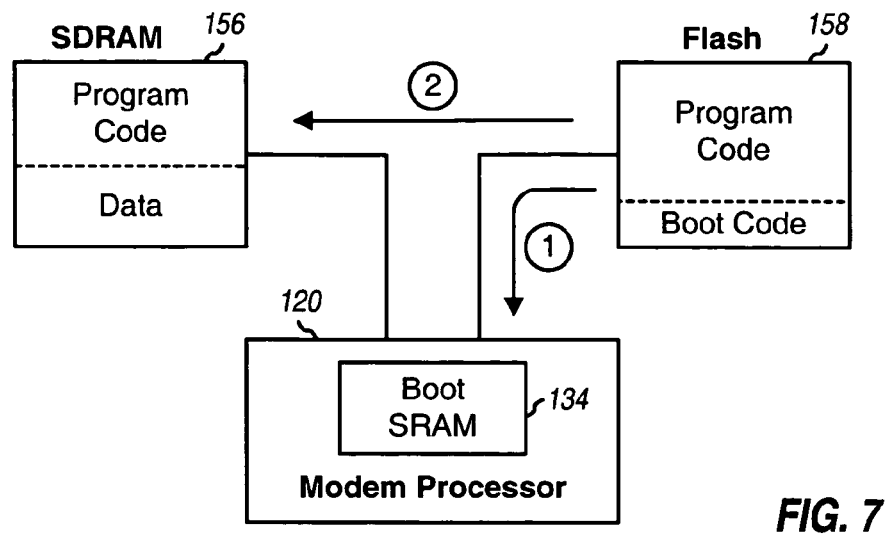
FIG. 7 illustrates a software boot process for the modem processor.

FIG. 7 illustrates a software boot process for non-volatile memory 158, which is implemented with a NAND Flash. The software boot process is performed in two parts. In the first part, a boot code is downloaded from non-volatile memory 158 (NAND Flash) to internal memory 134 (e.g., an SRAM) when terminal 100 is first powered up. The boot code configures a memory controller, sets up memory 156, turns on buses, and so on. In the second part, a software downloader copies the rest of the code from non-volatile memory 158 to volatile memory 156 (e.g., via data bus 128 within modem processor 120). The code then sets up an embedded file system (EFS) in memory 156 and configures modem processor 120. The first part of the software boot process may be relatively quick (e.g., less than one msec) but the second part can take a long period of time (e.g., approximately two seconds) to complete.

Memory 156 is a volatile memory that loses its data if powered down. When the collapsible power domains are powered down during sleep, volatile memory 156 is placed in the low power mode. In this low power mode, memory 156 periodically recharges (i.e., refreshes) its memory cells so that the code and data are retained. Power control unit 140 places memory 156 in the low power mode during the power-down time and takes memory 156 out of the low power mode during the power-up time. SDRAM with self-refresh is commercially available and may be used for memory 156.

When the collapsed power domains are powered back up again, a software reboot process is performed to restore operation of modem processor 120. For the software reboot, only the first part of the software boot process described in FIG. 7 is repeated, and most of the second part is skipped. Memory 156 is then taken out of the low power mode. The code in memory 156 then configures the processing units within modem processor 120. Because the code is retained by memory 156 during sleep, the initialization of memory 156, the code download from non-volatile memory 158 to memory 156, and the EFS setup in the second part can all be skipped. This can greatly shorten the amount of time needed for the software reboot.

The boot code may also be stored in a ROM within modem processor 120. In this case, the boot code can be executed from the ROM at power up, without having to be downloaded from the external non-volatile memory 158.

Some hardware states may need to be saved prior to powering down the collapsible power domains. These hardware states may include configuration information for various processing units such as modem core 130, PLLs 136, and so on. The hardware states may be saved in state registers 242 within power control unit 140, memory 156, or external memory 156 prior to powering down. Upon powering up after a sleep, the hardware states are restored by retrieving hardware state registers that were previously saved. The hardware states are restored after the software reboot process is completed because the software also configures the hardware.

Always-on power domain 210*a* couples to and communicates with collapsible power domains 210*b* through 210*e* via I/O interfaces. As noted above, different power domains may be coupled to different power supply buses with different voltages. In this case, level shifting is performed for each signal going from a power domain with a lower supply voltage to a power domain with a higher supply voltage.

When the collapsible power domains are powered down, the output interfaces of the collapsed power domains are no longer driven by these domains. These output interfaces are clamped to either logic low or high (e.g., circuit ground or supply voltage), as appropriate, so that circuits coupled to these interfaces are not affected. It is also desirable to clamp the inputs to the collapsed power domains in order to avoid leakage paths from the I/O interfaces to these power domains.

Two control signals (i.e., the freeze_io and power_down signals) are generated by power control unit 140 in the always-on power domain and used to control (i.e., clamp and freeze/release) the interfaces between the collapsible power domains and the always-on power domain and pads. These control signals allow the clamping and freezing/releasing to be performed in the desired temporal order. For example, when powering up, it may be desirable to first unclamp the input signals for the collapsed power domains and then release the output signals from the collapsed power domains.

Figure 8A:
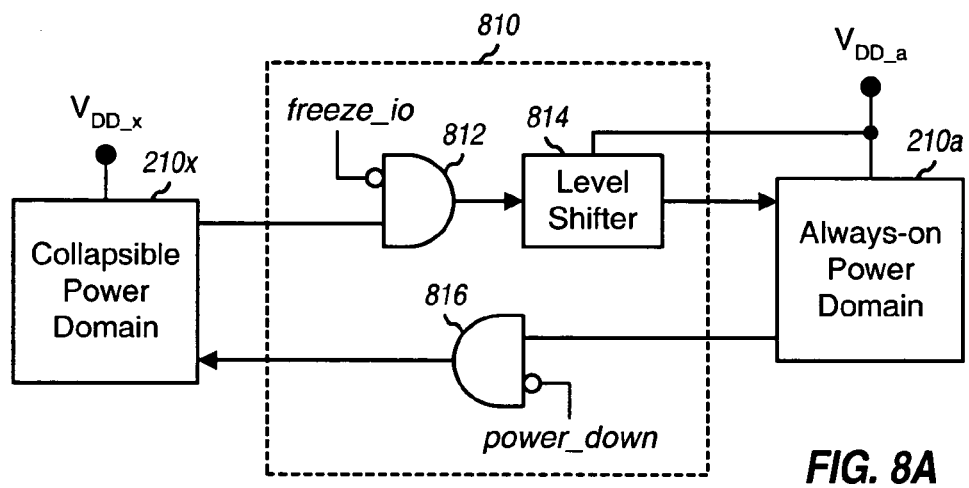
FIGS. 8A and 8B show interface and output circuits between the power domains and/or modem processor pads.

FIG. 8A shows an interface circuit 810 between a (lower-voltage) collapsible power domain 210*x* and (higher-voltage) always-on power domain 210*a*. Interface circuit 810 performs level-shifting and clamping to ground for an output signal from power domain 210*x*. Within interface circuit 810, for the output path, a NAND gate 812 receives and clamps the output signal from power domain 210*x* to logic low if the freeze_io signal is at logic high and passes the output signal otherwise. A level shifter 814 translates the output of NAND gate 812 from the lower supply voltage for power domain 210*x* to the higher supply voltage for power domain 210*a*. For the input path, a NAND gate 816 receives and forces an input signal from always-on power domain 210*a* to logic low if the power_down signal is at logic high and passes the input signal otherwise. Level shifting is needed going from a low-voltage domain to a high-voltage domain but is not needed going from the high-voltage domain to the low-voltage domain. The output signal from collapsible power domain 210*x* may also be clamped to logic high using appropriate circuitry.

The output pins for modem processor 120 are maintained at the latest logic state (i.e., the state just before powering down) during the entire time that the collapsible power domains are powered down. Other hardware units for terminal 100 may be dependent on these output pins. By maintaining the output pins at their most recent states, the other hardware units are minimally affected while modem processor 120 is powered down.

Each output pin is associated with pad circuitry that drives the pin. The pad circuitry receives an output signal for the pin, buffers the signal, and drives the output pin with the buffered signal. An exemplary output pad circuitry is described below.

Figure 8B:
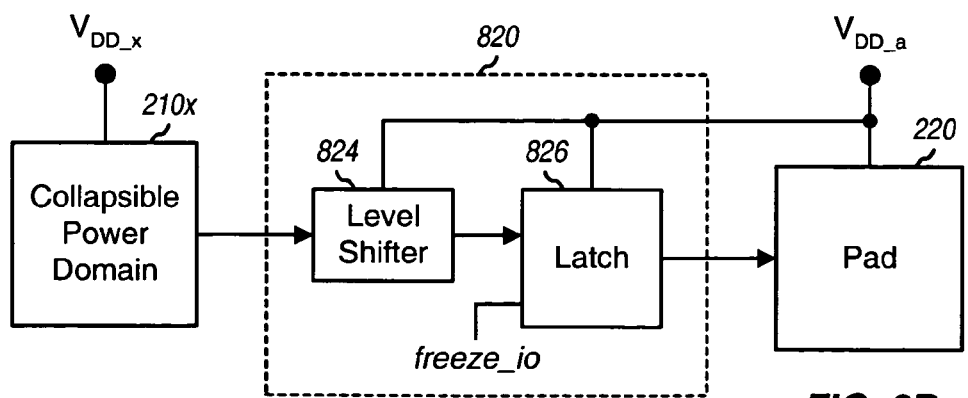

FIG. 8B shows an output circuit 820 between (lower-voltage) collapsible power domain 210*x* and a (higher-voltage) pad 220 for modem processor 120. Output circuit 820 performs level-shifting and latching for an output signal from power domain 210*x*. Within output circuit 820, a level shifter 824 shifts the output signal from power domain 210*x*. A latch 826 then latches the translated output signal with the freeze_io signal and provides the latched output signal to pad 220. The output signal is latched (i.e., frozen) when the freeze_io signal is at logic high and passes through otherwise. Pad 220 includes drive circuitry that drives a corresponding output pin for modem processor 120.

Input signals going from the pads of modem processor 120 to collapsible power domains may be clamped to circuit ground with NAND gate 816 in FIG. 8A or clamped to supply voltage. Interrupt controller 250 monitors pertinent input signals from the pads for conditions that require the collapsed power domains to be powered up again. These conditions may include, for example, external interrupts from other units/components within terminal 100. When such a condition is detected, interrupt controller 250 triggers power controller 252 to power up the collapsed power domains.

Referring to FIG. 3, external power supply buses 214*a* and 214*b* are provided via respective pads, and these pads may be tied together by one or more electrostatic discharge (ESD) diodes coupled in series. These ESD diodes are used to prevent a large voltage from developing across the two power supply buses, which may occur due to, for example, electrostatic discharge. The ESD diodes are reverse-biased during normal operation. A sufficient number of ESD diodes are coupled in series such that these diodes are not forward biased when the collapsible power domain is powered down. The ESD diodes may be coupled in parallel with P-channel FET 312 but are not shown in FIG. 3 for simplicity.

For simplicity, all of the collapsible power domains are described as being powered on or off together in the above description. In general, each collapsible power domain may be powered on or off individually. It is possible to only power on the necessary collapsible power domains at any given moment. More complicated control mechanism is needed to achieve greater flexibility in powering on and off the collapsible power domains.

The techniques described herein for partitioning processing units into always-on and collapsible power domains may be used for various types of integrated circuits, such as a modem IC (as described above), a communication IC, a processor IC, and so on. These techniques may also be advantageously used for various applications such as wireless communication (as described above), wireless computing, and so on. In general, collapsible power domains may be used for any application with a timeline in which the power domains only need to be powered on for a portion of the time.

An integrated circuit with collapsible power domains and the techniques for powering on and off the collapsible power domains described herein may be implemented by various means. The integrated circuit with collapsible power domains may be an application specific integrated circuit (ASIC), a DSP, a programmable logic device (PLD), a field programmable gate array (FPGA), a processor, a controller, a micro-controller, a microprocessor, and so on. The controls for powering on and off the collapsible power domains may be implemented in hardware or software. For a hardware implementation, the powering on/off control may be implemented within the integrated circuit (e.g., within power control unit 140 in modem processor 120) or external to the integrated circuit. For a software implementation, the powering on/off control may be implemented with modules (e.g., procedures, functions, and so-on) that perform the functions described herein. The software code may be stored in a memory unit (e.g., memories 134, 156 or 158 in FIG. 1) and executed by a processor (e.g., controller 132 FIG. 1 or power controller 252 in FIG. 2).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An integrated circuit for a wireless communication device, comprising:
    an always-on power domain including circuit blocks coupled to a first power supply and powered on at all times while the wireless device is powered on; and
    at least one collapsible power domain, each collapsible power domain including circuit blocks coupled to a second power supply via a respective power connection and powered on or off by the power connection, wherein the always-on power domain determines power on and off states of all of the at least one collapsible power domain and further independently determines power on and off state of each of the at least one collapsible power domain.

2. The integrated circuit of claim 1, wherein the circuit blocks in the at least one collapsible power domain are operable to perform modulation and demodulation for wireless communication.

3. The integrated circuit of claim 1, wherein the always-on power domain is operable to maintain a timeline for each of at least one wireless communication system, the timeline for each system indicating sleep times and on-line times for the wireless device with respect to the system, the sleep times corresponding to times that the wireless device does not receive messages from the system, and the on-line times corresponding to times that the wireless device processes a signal for the system.

4. The integrated circuit of claim 3, wherein the at least one collapsible power domain is powered off during the sleep times when the wireless device is not receiving messages from any one of the at least one wireless communication system.

5. The integrated circuit of claim 3, wherein the always-on power domain includes a sleep controller operable to maintain the timeline for each of the at least one wireless communication system.

6. The integrated circuit of claim 1, wherein the power connection for each collapsible power domain includes at least one switch operable to provide power to the circuit blocks in the power domain when enabled and to remove power from the circuit blocks when disabled.

7. The integrated circuit of claim 6, wherein the at least one switch for each power connection comprises a head-switch or a footswitch.

8. The integrated circuit of claim 1, wherein the first and second power supplies are one common power supply.

9. The integrated circuit of claim 1, wherein the first and second power supplies are different power supplies with different voltages.

10. The integrated circuit of claim 1, wherein the always-on power domain includes a power controller operable to provide at least one control signal to power on or off each of the at least one collapsible power domain.

11. The integrated circuit of claim 1, wherein the always-on power domain includes an interrupt controller operable to monitor input signals for the integrated circuit and to provide an indication to power on the at least one collapsible power domain if required by the input signals.

12. The integrated circuit of claim 1, wherein the always-on power domain includes a clock controller operable to enable and disable clocks for the at least one collapsible power domain.

13. The integrated circuit of claim 1, further comprising:
    at least one output circuit for at least one output pin of the integrated circuit, one output circuit for each output pin, each output circuit receiving an output signal from one of the at least one collapsible power domain and driving the associated output pin with the output signal.

14. The integrated circuit of claim 13, wherein each output circuit includes a latch operable to maintain logic state of the output signal for the associated output pin while the associated collapsible power domain is powered off.

15. The integrated circuit of claim 1, further comprising:
    at least one interface circuit for at least one connection between the always-on power domain and the at least one collapsible power domain, one interface circuit for each connection between two power domains, each interface circuit including a clamping circuit operable to clamp a respective interface signal to logic low or high.

16. The integrated circuit of claim 15, wherein each interface circuit further includes a level shifter operable to translate the respective interface signal between two different voltages for the two power domains.

17. The integrated circuit of claim 1, wherein the power connection for each collapsible power domain includes a sufficient number of electrostatic discharge (ESD) diodes to prevent shorting of the second power supply when the collapsible power domain is powered off.

18. The integrated circuit of claim 1, further comprising:
    an internal memory operable to receive boot code for configuring a memory system for the integrated circuit.

19. The integrated circuit of claim 1, wherein the wireless device is operable to communicate with a Code Division Multiple Access (CDMA) system.

20. The integrated circuit of claim 1, wherein the wireless device is operable to communicate with a Global System for Mobile Communications (GSM) system.

21. The integrated circuit of claim 1, wherein the always-on power domain maintains a finite state machine for each of the at least one collapsible power domain.

22. The integrated circuit of claim 1, wherein the always-on power domain performs a power down sequence to power down the at least one collapsible power domain.

23. The integrated circuit of claim 1, wherein the always-on power domain performs a power up sequence to power up the at least one collapsible power domain.

24. An integrated circuit for a wireless communication device, comprising:
- an always-on power domain including circuit blocks coupled to a first power supply and powered on at all times while the wireless device is powered on;
- at least one collapsible power domain, each collapsible power domain including circuit blocks coupled to a second power supply via a respective power connection and powered on or off by the power connection, wherein the always-on power domain determines power on and off states of all of the at least one collapsible power domain and further independently determines power on and off state of each of the at least one collapsible power domain; and
- an internal memory operable to receive boot code for configuring a memory system for the integrated circuit, wherein the boot code is downloaded from an external non-volatile memory to the internal memory and executed when the at least one collapsible power domain is powered on.

25. An integrated circuit for a wireless communication device, comprising:
- an always-on power domain including circuit blocks coupled to a first power supply and powered on at all times while the wireless device is powered on;
- at least one collapsible power domain, each collapsible power domain including circuit blocks coupled to a second power supply via a respective power connection and powered on or off by the power connection, wherein the always-on power domain determines power on and off states of all of the at least one collapsible power domain and further independently determines power on and off state of each of the at least one collapsible power domain; and
- an internal memory operable to receive boot code for configuring a memory system for the integrated circuit, wherein the boot code, when executed, configures a memory controller for the memory system and sets up an external volatile memory.

26. A wireless communication device comprising a modem processor operable to perform modulation and demodulation for wireless communication, the modem processor including
- an always-on power domain including circuit blocks coupled to a first power supply and powered on at all times while the wireless device is powered on, and
- at least one collapsible power domain, each collapsible power domain including circuit blocks coupled to a second power supply via a power connection and powered on or off by the power connection, wherein the always-on power domain determines power on and off states of all of the at least one collapsible power domain and further independently determines power on and off state of each of the at least one collapsible power domain.

27. The wireless device of claim 26, wherein the always-on power domain is operable to maintain a timeline for each of at least one wireless communication system, the timeline for each system indicating sleep times and on-line times for the wireless device with respect to the system, the sleep times corresponding to times that the wireless device does not received messages from the system, and the on-line times corresponding to times that the wireless device processes a signal for the system, and wherein the at least one collapsible power domain is powered off during the sleep times for the at least one system.

28. The wireless device of claim 26, further comprising:
- a main oscillator operable to provide a main clock used by circuit blocks in the modem processor while the at least one collapsible power domain is powered on; and
- a sleep oscillator operable to provide a sleep clock used by the circuit blocks in the always-on power domain while the at least one collapsible power domain is powered off, wherein the sleep clock has a lower frequency than the main clock.

29. The wireless device of claim 26, further comprising:
- a volatile memory operable to store program code for the wireless device, wherein the volatile memory is placed in a self-refresh mode when not accessed by any collapsible power domain.

30. A method of conserving power for a wireless communication device, the method comprising:
- powering on circuit blocks in an always-on power domain at all times while the wireless device is powered on;
- powering on or off circuit blocks in each of at least one collapsible power domain via a power connection for the collapsible power domain; and
- determining power on and off states of all of the at least one collapsible power domain and independently for each of the at least one collapsible power domain with the always-on power domain.

31. The method of claim 30, further comprising:
receiving an indication to enter sleep, and wherein the circuit blocks in the at least one collapsible power domain are powered off during sleep exceeding a particular time duration.

32. The method of claim 30, further comprising:
latching logic states of output pins prior to powering off the at least one collapsible power domain; and
releasing the output pins after powering on the at least one collapsible power domain.

33. The method of claim 30, further comprising:
saving hardware states prior to powering off the at least one collapsible power domain; and
restoring the hardware states after powering on the at least one collapsible power domain.

34. The method of claim 30, further comprising:
placing a volatile memory in a self-refresh mode prior to powering off the at least one collapsible power domain; and
taking the volatile memory out of the self-refresh mode after powering on the at least one collapsible power domain.

35. The method of claim 30, further comprising:
disabling clocks for the at least one collapsible power domain prior to powering off the at least one collapsible power domain; and
enabling the clocks after powering on the at least one collapsible power domain.

36. The method of claim 30, further comprising:
powering off an oscillator used to generate the clocks for the at least one collapsible power domain prior to powering off the at least one collapsible power domain; and
powering on the oscillator after powering on the at least one collapsible power domain.

37. An apparatus for wireless communication, comprising
means for powering on circuit blocks in an always-on power domain at all times while the wireless device is powered on;
means for powering on or off circuit blocks in each of at least one collapsible power domain via a power connection for the collapsible power domain; and means for determining power on and off states of all of the at least one collapsible power domain and independently for each of the at least one collapsible power domain with the always-on power domain.

38. The apparatus of claim 37, further comprising:
means for receiving an indication to enter sleep, and wherein the circuit blocks in the at least one collapsible power domain are powered off during sleep.

39. The apparatus of claim 37, further comprising:
means for latching logic states of output pins prior to powering off the at least one collapsible power domain; and
means for releasing the output pins after powering on the at least one collapsible power domain.

* * * * *